(12) United States Patent
Bear et al.

(10) Patent No.: US 10,180,960 B2
(45) Date of Patent: Jan. 15, 2019

(54) QUERY PROCESSING

(75) Inventors: Charles Edward Bear, Hudson, MA (US); Sreenath Bodagala, North Andover, MA (US); Matthew Steven Fuller, Medfield, MA (US); Andrew Allinson Lamb, Boston, MA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 494 days.

(21) Appl. No.: 14/398,229

(22) PCT Filed: May 15, 2012

(86) PCT No.: PCT/US2012/037938
§ 371 (c)(1),
(2), (4) Date: Oct. 31, 2014

(87) PCT Pub. No.: WO2013/172821
PCT Pub. Date: Nov. 21, 2013

(65) Prior Publication Data
US 2015/0088865 A1    Mar. 26, 2015

(51) Int. Cl.
*G06F 7/00* (2006.01)
*G06F 17/30* (2006.01)

(52) U.S. Cl.
CPC .. *G06F 17/30483* (2013.01); *G06F 17/30454* (2013.01); *G06F 17/30489* (2013.01); *G06F 17/30598* (2013.01)

(58) Field of Classification Search
None
See application file for complete search history.

(56) References Cited

U.S. PATENT DOCUMENTS

| 5,727,196 | A  | * | 3/1998  | Strauss, Jr. | G06F 17/30463 707/696 |
| 6,112,198 | A  | * | 8/2000  | Lohman | G06F 17/30445 |
| 6,212,552 | B1 | * | 4/2001  | Biliris | H04L 51/14 709/206 |
| 6,240,411 | B1 | * | 5/2001  | Thearling | G06F 17/30539 |
| 6,313,375 | B1 | * | 11/2001 | Jung | C07K 14/415 435/320.1 |
| 6,395,889 | B1 | * | 5/2002  | Robison | C12N 9/64 435/252.3 |

(Continued)

FOREIGN PATENT DOCUMENTS

CN    1588358    3/2005

OTHER PUBLICATIONS

International Searching Authority, Appl No. PCT/US2012/037938, The International Search Report and the Written Opinion, Aug. 27, 2013, 9 Pages.

(Continued)

*Primary Examiner* — Daniel Kuddus (57) ABSTRACT

A method for query processing includes receiving a query, and determining a query type by determining if the query is a structured query language (SQL) query including multiple distinct aggregates (MDAs), or a SQL query including cube, rollup or grouping sets operations. Based on the determination, the method includes processing the query to generate an output, and performing a predetermined number of maximum group by operations on the output based on the query type to generate a response to the query.

15 Claims, 4 Drawing Sheets

(56) References Cited

U.S. PATENT DOCUMENTS

| | | | |
|---|---|---|---|
| 6,420,526 B1* | 7/2002 | Ruben | G01N 33/68 |
| | | | 435/6.16 |
| 6,430,550 B1 | 8/2002 | Leo et al. | |
| 6,507,835 B1* | 1/2003 | Amundsen | G06F 17/30469 |
| 6,775,682 B1 | 8/2004 | Ballamkonda et al. | |
| 7,725,455 B1 | 5/2010 | Shatdal | |
| 8,005,868 B2 | 8/2011 | Saborit et al. | |
| 2002/0095430 A1* | 7/2002 | Egilsson | G06F 17/30392 |
| 2004/0236735 A1* | 11/2004 | Chaudhuri | G06F 17/30489 |
| 2005/0071320 A1 | 3/2005 | Chkodrov et al. | |
| 2007/0233808 A1* | 10/2007 | Egnor | G06F 17/30864 |
| | | | 709/217 |
| 2009/0228433 A1* | 9/2009 | Aguilar Saborit | |
| | | | G06F 17/30489 |
| 2010/0094829 A1* | 4/2010 | Castellanos | G06F 17/30306 |
| | | | 707/705 |
| 2010/0257191 A1* | 10/2010 | Ostrovsky | G06F 17/30445 |
| | | | 707/764 |
| 2011/0094829 A1* | 4/2011 | Seidel | B21B 27/10 |
| | | | 184/6.4 |
| 2012/0110519 A1* | 5/2012 | Werner | G06F 17/30398 |
| | | | 715/863 |
| 2016/0179922 A1* | 6/2016 | Crupi | G06F 17/30401 |
| | | | 707/737 |

OTHER PUBLICATIONS

Extended European Search Report, Application No. PCT/US2012/037938, The Supplemental European Search Report and the European Search Opinion, dated Aug. 26, 2015, 7 pages.

* cited by examiner

QUERY PROCESSING

BACKGROUND

Query processing with multiple distinct aggregates, cube, rollup, and grouping sets can include maintaining separate streams of groupings and then performing operations, such as group by, join, etc., on the streams to generate query results. The number of streams and the number of group by or join operations are proportional, for example, to the number of distinct aggregates in the query. This results in increased memory usage and thus increased expense as the number of distinct operations to respond to a query increases. This can further result in a distributed deadlock.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A query processing apparatus and method are described herein and provide for efficient answering of structured query language (SQL) queries with multiple distinct aggregates (IVIDAs), and SQL queries with cube, rollup or grouping sets operations. Generally, the query processing apparatus includes a query input module to receive a query. A query determination module determines whether the SQL query includes MDAs, or cube, rollup or grouping sets operations. Based on the determination, an intermediate processing module processes the From and Where clauses of the query and forwards the results to a group generator module. The group generator module generates groupings as an output specific to the query type. For a SQL query including MDAs, a SQL-MDA group by processing module performs two successive group by operations on the output of the group generator module to answer the query. For a SQL query including cube, rollup or grouping sets operations, a SQL cube, rollup and grouping sets group by processing module performs a single group by operation on the output of the group generator module to answer the query.

The apparatus and method provide for the processing of intermediate results (or the results of intermediate groupings) that are generated during processing of SQL queries with MDAs, or cube, rollup or grouping sets operations. The number of group by operations that are needed to answer the foregoing query types are also bound. Furthermore, the intermediate results (i.e., the output of the group generator module) are maintained in a single stream, which eliminates the possibility of distributed deadlock.

For a SQL query including MDAs, the number of group by operations used is two. Thus, for a SQL query including MDAs, the number of group by operations is independent of the number of distinct aggregates in the query and remains at two. For a SQL query including cube, rollup and grouping sets operations, the number of group by operations used is one. Since the number of group by operations are limited, the resources needed are also limited, and are therefore unrelated, for example, to the number of MDAs, or the number of keys in cube or rollup operations, or the number of sets in the grouping sets operation.

Figure 1:
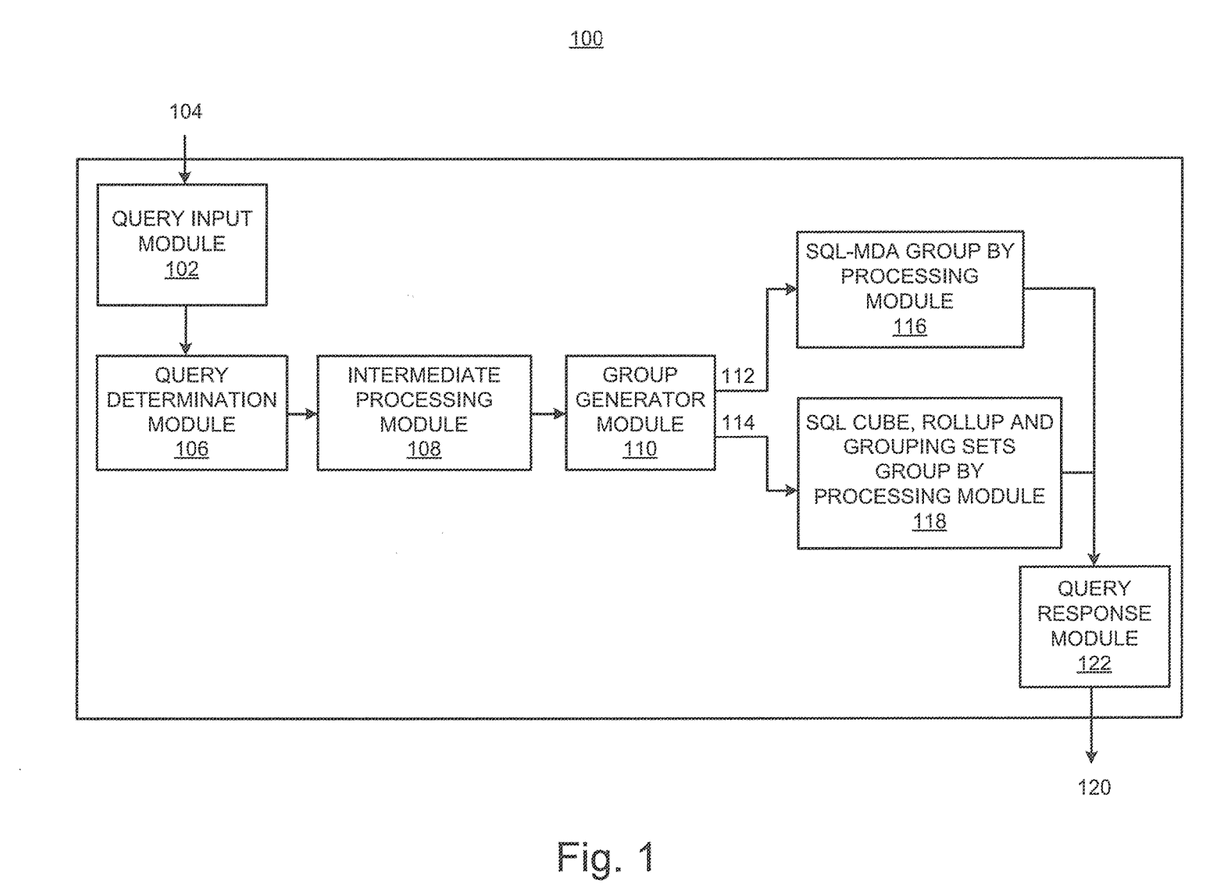
FIG. 1 illustrates an architecture of a query processing apparatus, according to an example of the present disclosure.

FIG. 1 illustrates an architecture of a query processing apparatus 100, according to an example. Referring to FIG. 1, the apparatus 100 is depicted as including a query input module 102 to receive a query 104. The query 104 may be a SQL query including MDAs, or a SQL query including cube, rollup or grouping sets operations. A query determination module 106 determines whether the SQL query includes MDAs, or cube, rollup or grouping sets operations. Based on the determination, an intermediate processing module 108 processes the query and forwards the results to a group generator module 110. The group generator module 110 processes the query and the input from the intermediate processing module 108 to generate an output 112 for a SQL query including MDAs, or an output 114 for a SQL query including cube, rollup or grouping sets operations. For a SQL query including MDAs, a SQL-MDA group by processing module 116 performs two successive group by operations on the output 112 of the group generator module 110 to answer a query. For a SQL query including cube, rollup or grouping sets operations, a SQL cube, rollup and grouping sets group by processing module 118 performs a single group by operation on the output 114 of the group generator module 110 to answer a query. The answer to the query 104 is output at 120 by a query response module 122. The query response module 122 also performs any additional processing needed based on the query type on the outputs of the SQL-MDA group by processing module 116 and the SQL cube, rollup and grouping sets group by processing module 118.

The modules 102, 106, 108, 110, 116, 118 and 122, and other components of the apparatus 100 may comprise machine readable instructions stored on a computer readable medium. In addition, or alternatively, the modules 102, 106, 108, 110, 116, 118 and 122, and other components of the apparatus 100 may comprise hardware or a combination of machine readable instructions and hardware.

Generally, the group generator module 110 generates groupings used to answer the query 104 based on whether the SQL query includes MDAs, or cube, rollup or grouping sets operations. An example of a SQL query with MDAs for a Table 1 (i.e., Table foo) is as follows:

TABLE 1

| Table foo | | |
|---|---|---|
| a | b | c |
| integer | integer | integer |

A SQL query with MDAs (e.g., two distinct aggregations for the following example) may include: select a, sum(distinct b), count(distinct c) from foo group by a. A SQL query including cube, rollup and grouping sets operations allows for the performance of multi-level aggregations in a single query. An example of a SQL query including a cube operation for Table 1 may include: select a, b, sum(b) from foo group by cube(a, b). An example of a SQL query including a rollup operation for Table 1 may include: select a, b, sum(b) from foo group by rollup (a, b). Similarly, an example of a SQL query including a grouping sets operation for Table may include: select a, b, sum(b) from foo group by grouping sets (a, (b,c)).

Generally, SQL queries including MDAs or cube, rollup or grouping sets operations use multiple groups that are formed and processed. For the foregoing example of a SQL query including MDAs, the query returns a sum of all unique values of b, and a count of all unique values of c, for each unique value of a. This operation is based on a determination of all unique values of b and c for each unique value of a, which uses the groupings {a, b} and {a, c}. For the foregoing example of a SQL query including a cube operation, the operation uses the groupings { }, {a}, {b}, {a, b}. For the foregoing example of a SQL query including a rollup operation, the operation uses the groupings { }, {a}, {a,b}. Further, for the foregoing example of a SQL query including a grouping sets operation, the operation uses the groupings {a}, {b,c}. As described in detail below, the query processing apparatus and method provide for the generation, propagation and processing of these different groupings.

With regard to the processing of the foregoing SQL query with MDAs, the modules 110 and 116 apply the transformation shown below:

```
select a, sum(b), count(c)
from ( select a, b, c, grouping_id
    from ( select a, b, null as c, 0 as grouping_id
    from foo
    union all
    select a, null, c, 1 from foo )
    group by a, b, c, grouping_id )
group by a
```

The group generator module 110 thus implements the innermost subquery (i.e., select a, b. null as c, 0 as grouping_id from foo union all select a, null, c, 1 from foo) in the foregoing transformation. The two outer select blocks (i.e., select a, b, c, grouping_id from (. . . ) group by a, b, c, grouping_id and select a, sum(b), count(c) from ( . . . ) group by a) present the two group by operations that are applied over the output 112 of the group generator module 110 by the SQL-MDA group by processing module 116.

For a SQL query with MDAs generally, the specification of the group generator module 110 and the two group by operations that are applied to the output 112 of the group generator module 110 by the SQL-MDA group by processing module 116 are described.

With regard to the general specification of the group generator module 110 for handling SQL queries with MDAs, consider the following generalized SQL:

select $g_1, \ldots, g_m$, agg($a_1$), . . . , agg($a_k$), agg(distinct $d_1$), . . . , agg(distinct $d_n$)
from < >
where < >
group by $g_1, \ldots, g_m$ The foregoing SQL query with MDAs contains m (m≥0) grouping columns ($g_1, \ldots, g_m$), k (k≥0) non-distinct aggregates, and n (n>1) distinct aggregates. Since operation of the group generator module 110 is independent of the contents of the foregoing From and Where clauses (i.e., from < >, where < >), no details are provided as to the contents of these clauses.

For the specification of the group generator module 110, let "foo" represent the input data stream (the result of processing the Where clause (i.e., where < >) by the intermediate processing module 108) to the group generator module 110. The group generator module 110 will output (m+n+k+1) columns at the output 112, as presented by the following SQL:

select $g_1, \ldots, g_m, a_1, \ldots, a_k, d_1, \ldots$, null, . . . , null, 0 as grouping_id from foo
. . .
union all
select $g_1, \ldots, g_m$, null, . . . , null, null, . . . , $d_i$, . . . , null, i from foo
. . .
union all
select $g_1, \ldots, g_m$, null, . . . , null, . . . , null, . . . , null, . . . , $d_n$, n-1 from foo For the foregoing generalized SQL query with MDAs, the two group by operations performed by the SQL-MDA group by processing module 116 are specified as follows. The inner group by operation may be specified as follows:
Group by:
Grouping columns: ($g_1, \ldots, g_m$, grouping_id)
Aggregates: agg($a_1$), . . . , agg($a_k$)
The outer group by may be specified as follows:
Group by:
Grouping columns: ($g_1, \ldots, g_m$)
Aggregates: (agg($d_1$), . . . , agg($d_n$),agg_convert ($a_1$), . . . , agg_convert($a_k$))

For the foregoing outer group, agg_convert is a converted aggregate as specified by the following two rules. For rule 1, if agg is "count" or "count(*)" then agg_convert is "sum". For rule 2, if agg is neither "count" nor "count(*)" then agg —convert is the same as agg.

Based on the foregoing discussion related to operation of the intermediate processing module 108 and the group generator module 110 for generalized SQL queries with MDAs, a SQL query with MDAs is processed by first processing the From and the Where clauses of the query (i.e., the where < > clause in the foregoing example of generalized SQL queries with MDAs). The Where clause is processed by the intermediate processing module 108. The output of the intermediate processing module 108 is fed into the group generator module 110, which outputs (m+n+k+1) columns at the output 112. The output 112 of the group generator module 110 is fed to the SQL-MDA group by processing module 116, which performs two successive group by operations on the output 112 to answer a query.

An example of an operation of the group generator module 110 for a SQL queries with MDAs is described. The SQL query including MDAs relates to Table 2 (i.e., Table Orders) as follows, which also includes the data specified below:

TABLE 2

Table Orders

| orderid integer | prodid integer | dealerid integer | amount integer | quantity integer |
|---|---|---|---|---|
| 0 | 0 | 5 | 300 | 10 |
| 1 | 0 | 10 | 300 | 10 |
| 2 | 1 | 5 | 1500 | 500 |

For Table 2, the terms are specified as follows:
  orderid=Order Identification (ID)
  prodid=Product ID
  dealerid=Dealer ID
  amount=Amount
  quantity=Quantity
For a SQL query including MDAs, the query may specify:
  select prodid, sum(distinct amount) as sum_amount, sum (distinct quantity) as
  sum_quantity from orders group by prodid;
The output of the SQL query including MDAs is specified in Table 3:

TABLE 3

Output of SQL Query including MDAs

| prodid | sum_amount | sum_quantity |
|---|---|---|
| 0 | 300 | 10 |
| 1 | 1500 | 500 |

For Table 3, the terms that are not previously defined are specified as follows:
  sum_amount=Summation of Amount
  sum_quantity=Summation of Quantity
In order to transform the foregoing example of a SQL query including MDAs, the transformation shown below is applied by the modules 110 and 116:

```
select prodid, sum(amount), sum(quantity)
from (
  select prodid, amount, quantity, grouping_id
  from (
    select prodid, amount, null as quantity, 0 as grouping_id
    from orders
    union all
    select prodid, null, quantity, 1
    from orders
  ) sq
  group by prodid, amount, quantity, grouping_id
) osq
group by prodid
```

The output of each of the blocks in the foregoing example of a SQL query including MDAs is given below in Tables 4-6.

TABLE 4

Innermost Query Block

```
select prodid, amount, null as quantity, 0 as grouping_id
from orders
union all
select prodid, null, quantity, 1
from orders
```

TABLE 4-continued

Innermost Query Block

| prodid | amount | quantity | grouping_id |
|---|---|---|---|
| 0 | 300 | null | 0 |
| 0 | 300 | null | 0 |
| 1 | 1500 | null | 0 |
| 0 | null | 10 | 1 |
| 0 | null | 10 | 1 |
| 1 | null | 500 | 1 |

For Table 4, the terms that are not previously defined are specified as follows:
  grouping_id=Grouping ID

TABLE 5

Inner Group by Block

```
select prodid, amount, quantity, grouping_id
from (
  select prodid, amount, null as quantity, 0 as grouping_id
  from orders
  union all
  select prodid, null, quantity, 1
  from orders
)
group by prodid, amount, quantity, grouping_id
```

| prodid | amount | quantity | grouping_id |
|---|---|---|---|
| 0 | 300 | null | 0 |
| 1 | 1500 | null | 0 |
| 0 | null | 10 | 1 |
| 1 | null | 500 | 1 |

TABLE 6

Outer Group by Block

```
select prodid, sum(amount), sum(quantity)
from (
  select prodid, amount, quantity, grouping_id
  from (
    select prodid, amount, null as quantity, 0 as grouping_id
    from orders
    union all
    select prodid, null, quantity, 1
    from orders
  )
  group by prodid, amount, quantity, grouping_id
)
group by prodid
```

| prodid | sum_amount | sum_quantity |
|---|---|---|
| 0 | 300 | 10 |
| 1 | 1500 | 500 |

With regard to a SQL query including cube, rollup or grouping sets operations, generally, the group generator module 110 generates the groupings as the output 114. The output 114 of the group generator module 110 is fed to the SQL cube, rollup and grouping sets group by processing module 118, which performs a single group by operation on the output 114 answer a query. The answer to the query 104 is output at 120 by the query response module 122.

An example of a general SQL query including cube, rollup and grouping sets operations is as follows:
  select $g_1, \ldots, g_m$, agg($a_1$), . . . ,agg($a_k$)
  from < >
  where < >
  group by OPR($g_1, \ldots, g_m$);

OPR($g_1, \ldots, g_m$) may be any of the following:
   cube($g_1, \ldots, g_m$)
   rollup($g_1, \ldots, g_m$)
   grouping sets(subset$_1$($g_1, \ldots, g_m$), $\ldots$, subset$_n$ ($g_1, \ldots, g_m$))

With regard to cube($g_1, \ldots, g_m$), the group generator module 110 is specified as follows. Cube($g_1, \ldots, g_m$) forms $2^m$ groupings (i.e., all possible combinations over columns ($g_1, \ldots, g_m$)). The group generator module 110 outputs at 114 (m+k+1) columns, as presented by the following SQL: Let "foo" represent the input data stream (the result of processing the From and Where clauses (i.e., from < >, where < >) by the intermediate processing module 108 to the group generator module 110. Each "union all" branch below will generate one of the $2^m$ combinations.

select null, $\ldots$, null, $\ldots$, null, $\ldots$, $a_1, \ldots a_k$, 0 as grouping_id from foo
   union all
   select $g_1, \ldots$, null, $\ldots$, null, $\ldots$, $a_1, \ldots, a_k$, 1 from foo
   $\ldots$
   union all
   select null, $\ldots$, $g_1, \ldots$, null, $a_1, \ldots, a_k$, i from foo
   $\ldots$
   union all select null, $\ldots$, null, $\ldots$, $g_m, a_1, \ldots, a_k$, m from foo;
   $\ldots$
   union all
   select $g_1, \ldots, g_1, \ldots, g_i, \ldots, g_m, \ldots, a_1, \ldots, a_k$, $2^m$ from foo With regard to rollup($g_1, \ldots, g_m$), the group generator module 110 may be specified as follows. The group generator module 110 outputs (m+k+1) columns, as presented by the following SQL. Let "foo" represent the input data stream from the intermediate processing module 108 to the group generator module 110. Rollup($g_1, \ldots, g_m$) will form (m+1) groupings: ( ), ($g_1$), ($g_1, \ldots, g_2$), $\ldots$, ($g_1, g_2, g_3$), $\ldots$, ($g_1, g_2, \ldots, g_m$). Each "union all" branch below will generate one of the above (m+1) groupings as follows:

select null, $\ldots$, null, $\ldots$, null, $a_1, \ldots, a_k$, 0 as grouping_id from foo
   union all
   select $g_1, \ldots$, null, $\ldots$, $a_1, \ldots, a_k$, 1 from foo
   union all
   select $g_1, \ldots, g_i, \ldots$, null, $\ldots$, $a_1, \ldots, a_k$, i from foo
   union all
   select $g_1, \ldots, g_i, \ldots, g_m, a_1, \ldots, a_k$, m from foo With regard to grouping sets(subset$_1$($g_1, \ldots, g_m$), $\ldots$, subset$_n$($g_1, \ldots, g_m$)), the group generator module 110 may be specified as follows. The group generator module 110 outputs (m+k+1) columns, as presented by the following SQL. Let "foo" represent the input data stream from the intermediate processing module 108 to the group generator module 110. Grouping sets(subset$_1$($g_1, \ldots, g_m$), $\ldots$, subset$_n$($g_1, \ldots, g_m$) will form (n) groupings subset$_1$ ($g_1, \ldots, g_{mn}$), $\ldots$, subset$_n$($g_i, \ldots, g_m$), Each "union all" branch below will generate one of the above (n) groupings.

select subset_1($g_1, \ldots, g_m$), $a_1, \ldots, a_k$, 0 as grouping_id from foo
   union all
   $\ldots$
   select subset_i($g_1, \ldots, g_m$), $a_1, \ldots, a_k$, i from foo
   $\ldots$
   union all
   select subset_n($g_1, \ldots, g_m$), $a_1, \ldots, a_k$, n from foo The SQL cube, rollup and grouping sets group by processing module 118, which receives the output 114 of the group generator module 110 is specified as follows. The group by operation of the SQL cube, rollup and grouping sets group by processing module 118 proceeds as follows:

Group by:
   Grouping columns: ($g_1, \ldots, g_m$, grouping_id)
   Aggregates: (agg($a_1$), $\ldots$, agg($a_k$))

Based on the foregoing discussion related to operation of the group generator module 110 for a SQL query including cube, rollup or grouping sets operations, generally, a SQL query including cube, rollup or grouping sets operations is processed by first processing the From and the Where clauses of the query (i.e., the where < > clause in the foregoing example of generalized SQL query including cube, rollup or grouping sets operations). The Where clause is processed by the intermediate processing module 108. The output of the intermediate processing module 108 is fed into the group generator module 110. The output 114 of the group generator module 110 is fed to the SQL cube, rollup and grouping sets group by processing module 118, which performs a single group by operation on the output 114 to answer a query. The answer to the query 104 is output at 120 by the query response module 122.

An example of an operation of the group generator module 110 for a SQL query including a cube operation is described. The SQL query including a cube operation relates to Table 2 (i.e., Table Orders) as described previously. For the SQL query including a cube operation, the query may specify:

select prodid, dealerid, sum(amount) as sum_amount, sum(quantity) as
   sum_quantity
   from orders
   group by cube(prodid, dealerid)

The output of the SQL query including the cube operation is specified in Table 7:

TABLE 7

Output of SQL Query Including Cube Operation

| prodid | dealerid | sum_amount | sum_quantity |
|---|---|---|---|
| null | null | 2100 | 520 |
| null | 5 | 1800 | 510 |
| null | 10 | 300 | 10 |
| 0 | null | 600 | 20 |
| 1 | null | 1500 | 500 |
| 0 | 5 | 300 | 10 |
| 0 | 10 | 300 | 10 |
| 1 | 5 | 1500 | 500 |

In order to transform the foregoing example of the SQL query including the cube operation, the transformation shown below is applied by the modules 110 and 118:

select prodid, dearlerid, sum(amount) as sum_amount, sum(quantity) as sum_quantity
from (
   select null as prodid, null as dearlerid, amount, quantity, 0 as grouping_id
   from orders
   union all
   select prodid, null, amount, quantity, 1
   from orders
   union all
   select null, dealerid, amount, quantity, 2
   from orders
   union all
   select prodid, dealerid, amount, quantity, 3
   from orders
)
group by pid, did, grouping_id The output of inner and outer query blocks in the foregoing example of a SQL query including the cube operation, as processed by the group generator module 110 and the SQL cube, rollup and grouping sets group by processing module 118, is shown below in Tables 8 and 9, respectively.

TABLE 8

Inner Query Block select null as prodid, null as dealerid, amount, quantity, 0 as grouping_id
from orders
union all
select prodid, null, amount, quantity, 1
from orders
union all
select null, dealerid, amount, quantity, 2
from orders
union all
select prodid, dealerid, amount, quantity, 3
from orders

| prodid | dealerid | amount | quantity | grouping_id |
|---|---|---|---|---|
| null | null | 300 | 10 | 0 |
| null | null | 300 | 10 | 0 |
| null | null | 1500 | 500 | 0 |
| 0 | null | 300 | 10 | 1 |
| 0 | null | 300 | 10 | 1 |
| 1 | null | 1500 | 500 | 1 |
| null | 5 | 300 | 10 | 2 |
| null | 5 | 1500 | 500 | 2 |
| null | 10 | 300 | 10 | 2 |
| 0 | 5 | 300 | 10 | 3 |
| 0 | 10 | 300 | 10 | 3 |
| 1 | 5 | 1500 | 500 | 3 |

TABLE 9

Outer Query Block select prodid, dearlerid, sum(amount) as sum_amount, sum(quantity) as sum_quantity
from (
  select null as prodid, null as dearlerid, amount, quantity,
  0 as grouping_id
  from orders
  union all
  select prodid, null, amount, quantity, 1
  from orders
  union all
  select null, dealerid, amount, quantity, 2
  from orders
  union all
  select prodid, dealerid, amount, quantity, 3
  from orders
  )
group by pid, did, grouping_id

| prodid | dealerid | sum_amount | sum_quantity |
|---|---|---|---|
| null | null | 2100 | 520 |
| null | 5 | 1800 | 510 |
| null | 10 | 300 | 10 |
| 0 | null | 600 | 20 |
| 1 | null | 1500 | 500 |
| 0 | 5 | 300 | 10 |
| 0 | 10 | 300 | 10 |
| 1 | 5 | 1500 | 500 |

An example of the operation of the group generator module 110 for a SQL query including a rollup operation is described. The SQL query including a rollup operation relates to Table 2 (i.e., Table Orders) as described previously. For the SQL query including a rollup operation, the query may specify:

select prodid, dealerid, sum(amount) as sum_amount, sum(quantity) as
sum_quantity
from orders
group by rollup(prodid, dealerid)

The output of the SQL query including the rollup operation is specified in Table 10:

TABLE 10

Output of SQL Query Including Rollup Operation

| prodid | dealerid | sum_amount | sum_quantity |
|---|---|---|---|
| null | null | 2100 | 520 |
| 0 | null | 600 | 20 |
| 1 | null | 1500 | 500 |
| 0 | 5 | 300 | 10 |
| 0 | 10 | 300 | 10 |
| 1 | 5 | 1500 | 500 |

In order to transform the foregoing example of the SQL query including the rollup operation, the transformation shown below is applied by the modules 110 and 118:

select prodid, dealerid, sum(amount) as sum_amount, sum(quantity) as sum_quantity
from (
  select null as prodid, null as dealerid, amount, quantity, 0 as
  grouping_id
  from orders
  union all
  select prodid, null, amount, quantity, 1
  from orders
  union all
  select prodid, dealerid, amount, quantity, 2
  from orders
) sq
group by prodid, dealerid, grouping_id The output of inner and outer query blocks in the foregoing example of a SQL query including the rollup operation, as processed by the group generator module 110 and the SQL cube, rollup and grouping sets group by processing module 118, is shown below in Tables 11 and 12, respectively.

TABLE 11

Inner Query Block select null as prodid, null as dealerid, amount, quantity, 0 as grouping_id
from orders
union all
select prodid, null, amount, quantity, 1
from orders
union all
select prodid, dealerid, amount, quantity, 2
from orders

| prodid | dealerid | amount | quantity | grouping_id |
|---|---|---|---|---|
| null | null | 300 | 10 | 0 |
| null | null | 300 | 10 | 0 |
| null | null | 1500 | 500 | 0 |
| 0 | null | 300 | 10 | 1 |
| 0 | null | 300 | 10 | 1 |
| 1 | null | 1500 | 500 | 1 |
| 0 | 5 | 300 | 10 | 2 |
| 0 | 10 | 300 | 10 | 2 |
| 1 | 5 | 1500 | 500 | 2 |

TABLE 12

Outer Query Block select prodid, dealerid, sum(amount) as sum_amount, sum(quantity) as sum_quantity
from (
  select null as prodid, null as dealerid, amount, quantity,
  0 as grouping_id
  from orders
  union all
  select prodid, null, amount, quantity, 1
  from orders
  union all
  select prodid, dealerid, amount, quantity, 2
  from orders
)
group by prodid, dealerid, grouping_id

| prodid | dealerid | sum_amount | sum_quantity |
|---|---|---|---|
| null | null | 2100 | 520 |
| 0 | null | 600 | 20 |
| 1 | null | 1500 | 500 |
| 0 | 5 | 300 | 10 |
| 0 | 10 | 300 | 10 |
| 1 | 5 | 1500 | 500 |

An example of an operation of the group generator module 110 for a SQL query including a grouping sets operation is described. The SQL query including a grouping sets operation relates to Table 2 (I.e., Table Orders) as described previously. For the SQL query including a grouping sets operation, the query may specify:

select prodid, dealerid, sum(amount) as sum_amount,
    sum(quantity) as
  sum_quantity
  from orders
  group by grouping sets(dealerid, (prodid, dealerid))

The output of the SQL query including the grouping sets operation is specified in Table 13:

TABLE 13

Output of SQL Query Including Grouping Sets Operation

| prodid | dealerid | sum_amount | sum_quantity |
|---|---|---|---|
| null | 5 | 1800 | 510 |
| null | 10 | 300 | 10 |
| 0 | 5 | 300 | 10 |
| 0 | 10 | 300 | 10 |
| 1 | 5 | 1500 | 500 |

In order to transform the foregoing example of the SQL query including the grouping sets operation, the transformation shown below is applied by the modules 110 and 118:

select prodid, dealerid, sum(amount) as sum_amount, sum(quantity) as sum_quantity
from (
  select null as prodid, dealerid, amount, quantity, 0 as grouping_id
  from orders
  union all
  select prodid, dealerid, amount, quantity, 1
  from orders
)
group by prodid, dealerid, grouping_id The output of inner and outer query blocks in the foregoing example of a SQL query including the grouping sets operation, as processed by the group generator module 110 and the SQL cube, rollup and grouping sets group by processing module 118, is shown below in Tables 14 and 15, respectively.

TABLE 14

Inner Query Block select null as prodid, dealerid, amount, quantity, 0 as grouping_id
from orders
union all
select prodid, dealerid, amount, quantity, 1
from orders

| prodid | dealerid | amount | quantity | grouping_id |
|---|---|---|---|---|
| null | 5 | 300 | 10 | 0 |
| null | 5 | 1500 | 500 | 0 |
| null | 10 | 300 | 10 | 0 |
| 0 | 5 | 300 | 10 | 1 |
| 0 | 10 | 300 | 10 | 1 |
| 1 | 5 | 1500 | 500 | 1 |

TABLE 15

Outer Query Block select prodid, dealerid, sum(amount) as sum_amount, sum(quantity) as sum_quantity
from (
  select null as prodid, dealerid, amount, quantity, 0 as grouping_id
  from orders
  union all
  select prodid, dealerid, amount, quantity, 1
  from orders
)
group by prodid, dealerid, grouping_id

| prodid | dealerid | sum_amount | sum_quantity |
|---|---|---|---|
| null | 5 | 1800 | 510 |
| null | 10 | 300 | 10 |
| 0 | 5 | 300 | 10 |
| 0 | 10 | 300 | 10 |
| 1 | 5 | 1500 | 500 |

Figure 2:
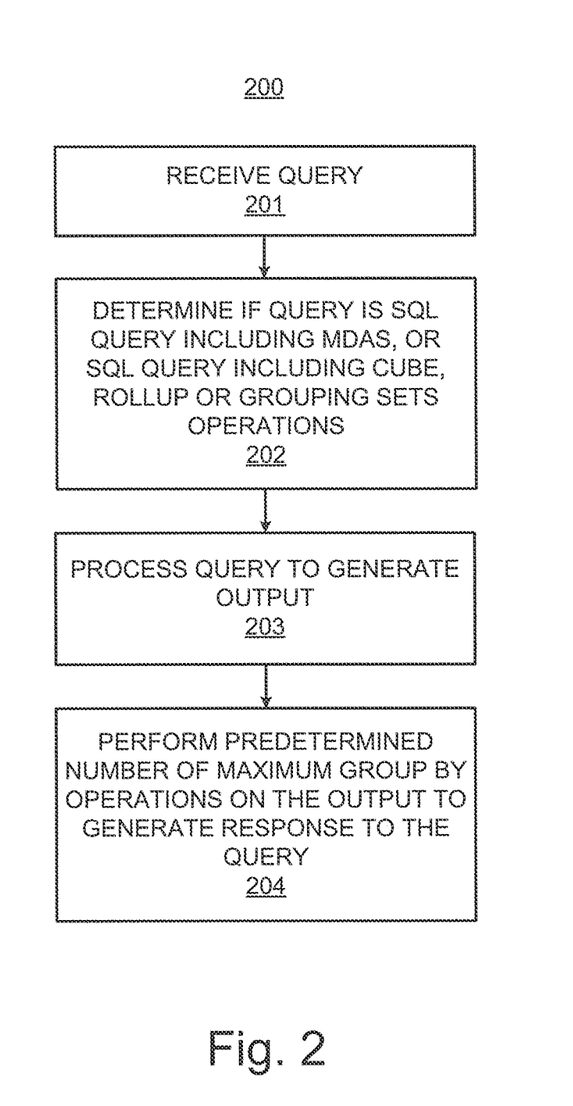
FIG. 2 illustrates a method for query processing, according to an example of the present disclosure.
Figure 3:
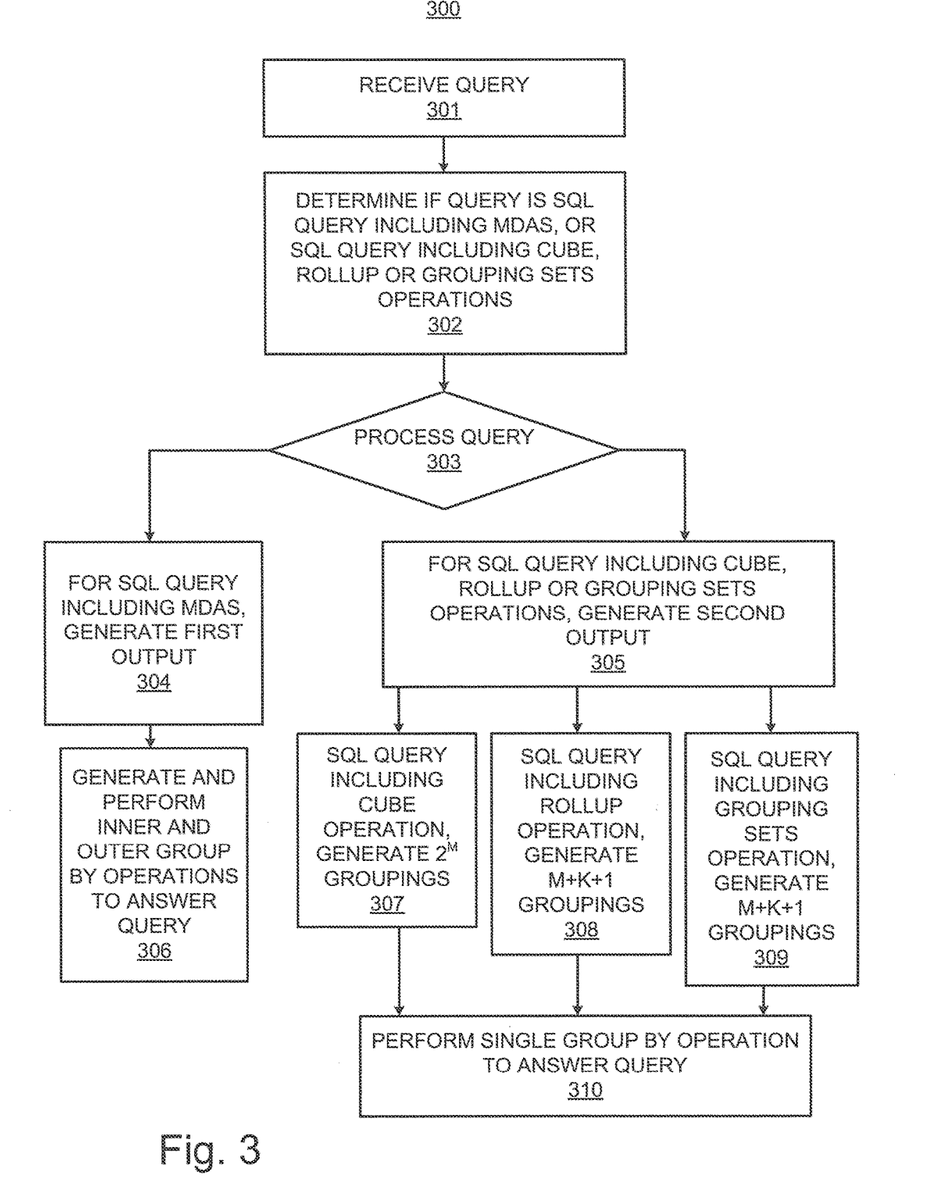
FIG. 3 illustrates further details of the method for query processing, according to an example of the present disclosure.

FIGS. 2 and 3 illustrate flowcharts of methods 200 and 300 for query processing, corresponding to the example of a query processing apparatus 100 whose construction is described in detail above. The methods 200 and 300 may be implemented on the query processing apparatus 100 with reference to FIG. 1 by way of example and not limitation. The methods 200 and 300 may be practiced in other apparatus.

Referring to FIG. 2, for the method 200, at block 201, a query is received. For example, referring to FIG. 1, the query input module 102 receives the query 104.

At block 202, a determination is made as to whether the query is a SQL query including MDAs, or a SQL query including cube, rollup or grouping sets operations. For example, referring to FIG. 1, the query determination module 106 determines whether the SQL query includes MDAs, or cube, rollup or grouping sets operations.

At block 203, based on the determination, the query is processed to generate an output. For example, referring to FIG. 1, the intermediate processing module 108 processes the From and the Where clauses of the query and forwards the results to the group generator module 110. The group generator module 110 processes the query and the input from the intermediate processing module 108 to generate the output 112 for a SQL query including MDAs, or the output 114 for a SQL query including cube, rollup or grouping sets operations.

At block 204, based on the query type, a predetermined number of maximum group by operations are performed on the output to generate a response to the query. For example, referring to FIG. 1, the SQL-MDA group by processing module 116 performs two successive group by operations on the output 112 of the group generator module 110 to answer a query. For a SQL query including cube, rollup or grouping sets operations, the SQL cube, rollup and grouping sets group by processing module 118 performs a single group by operation on the output 114 of the group generator module 110 to answer a query.

Referring to FIG. 3, for the method 300, at block 301, a query is received. For example, referring to FIG. 1, the query input module 102 receives the query 104.

At block 302, a determination is made as to whether the query is a SQL query including MDAs, or a SQL query including cube, rollup or grouping sets operations. For example, referring to FIG. 1, the query determination module 106 determines whether the SQL query includes MDAs, or cube, rollup or grouping sets operations.

At block 303, the From and the Where clauses of the query are processed. For example, referring to FIG. 1, the intermediate processing module 108 processes the From and the Where clauses of the query and forwards the results to the group generator module 110.

At block 304, for a SQL query including MDAs, a first output is generated. For example, referring to FIG. 1, the group generator module 110 processes the query and the input from the intermediate processing module 108 to generate the output 112 for a SQL query including MDAs.

At block 305, for a SQL query including cube, rollup or grouping sets operations, a second output is generated. For example, referring to FIG. 1, the group generator module 110 processes the query and the input from the intermediate processing module 108 to generate the output 114 for a SQL query including cube, rollup or grouping sets operations.

At block 306, for a SQL query including MDAs, inner and outer group by operations are generated and performed. For example, referring to FIG. 1, the SQL-MDA group by processing module 116 performs two successive group by operations on the output 112 of the group generator module 110 to answer a SQL query including MDAs.

At block 307, for a SQL query including the cube operation, $2^m$ groupings are generated, where m is a number of grouping columns for the cube operation. For example, cube($g_1, \ldots, g_m$) forms $2^m$ groupings (i.e., all possible combinations over columns ($g_1, \ldots, g_m$)).

At block 308, for a SQL query including the rollup operation, m+1 groupings are generated, where m is a number of grouping columns for the rollup operation. For example, the group generator module 110 outputs m+1 groupings, each with (m+k+1) columns, for a SQL query including the rollup operation with m number of grouping columns and k number of aggregates.

At block 309, for a SQL query including the grouping sets operation, n groupings are generated, where n is a number of sets for the grouping sets operation. For example, the group generator module 110 outputs n groupings, each with (m+k+1) columns, for a SQL query including the grouping sets operation with n number of grouping sets, m number of grouping columns and k number of aggregates.

Figure 4:
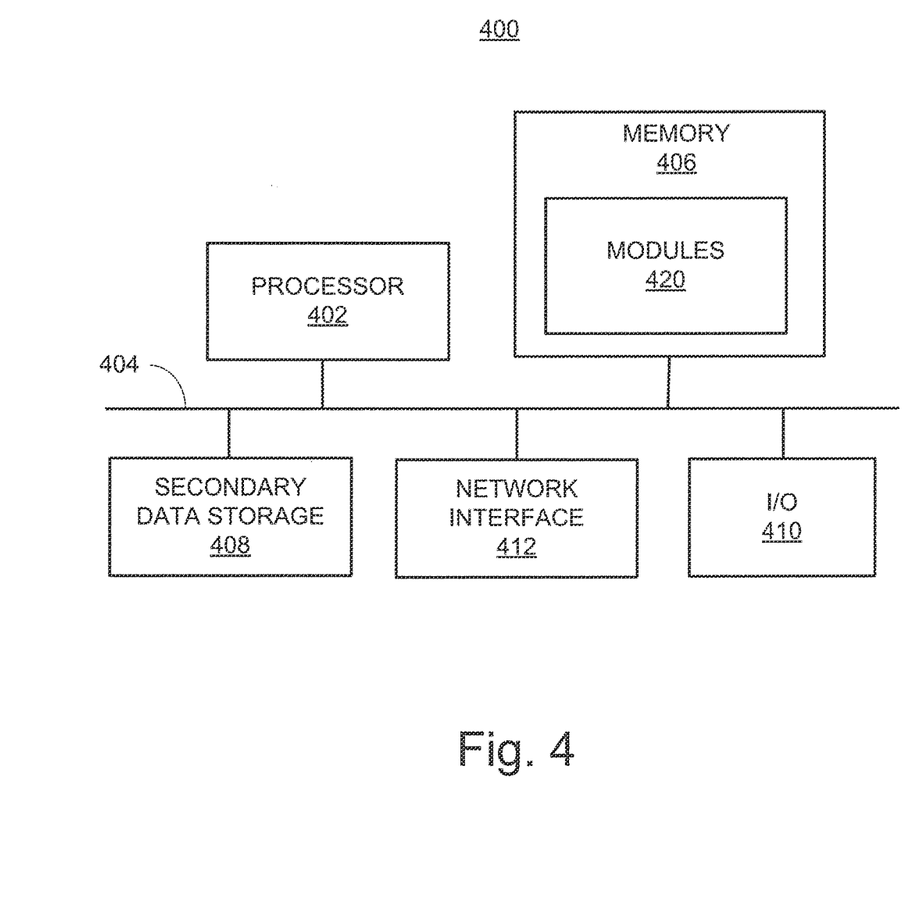
FIG. 4 illustrates a computer system, according to an example of the present disclosure.

At block 310, for the SQL query including cube, rollup or grouping sets operations, a single group by operation is performed on the output of the group generator module to answer a query. For example, referring to FIG. 1, the SQL cube, rollup and grouping sets group by processing module 118 performs a single group by operation on the output 114 of the group generator module 110 to answer a SQL query including cube, rollup or grouping sets operations, FIG. 4 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 402 that may implement or execute machine readable instructions performing some or all of the methods, functions and other processes described herein. Commands and data from the processor 402 are communicated over a communication bus 404. The computer system also includes a main memory 408, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 102, 106, 108, 110, 116, 118 and 122 of the apparatus shown in FIG. 1.

The computer system may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims —and their equivalents —in which all terms are meant in their broadest reasonable sense unless otherwise indicated.

What is claimed is:

1. A method for query processing, the method comprising:
   receiving a query, the query comprising a structured query language (SQL) query;
   determining a query type of the query based on whether the query comprises multiple distinct aggregates (MDAs) or cube, rollup or grouping sets operations;
   based on the determined query type, processing the query to generate an output comprising intermediate results;
   processing the intermediate results that are generated during the processing of the query, wherein the intermediate results are maintained in a single stream to prevent a distributed deadlock; and
   performing, by a processor, a predetermined number of maximum group by operations on the output based on the query type to generate a response to the query.

2. The method of claim 1, wherein the predetermined number of maximum group by operations is two if the query type is a SQL query including MDAs.

3. The method of claim 1, wherein the predetermined number of maximum group by operations is one if the query type is a SQL query including cube, rollup or grouping sets operations.

4. The method of claim 1, further comprising:
if the query type is a SQL query including MDAs, generating inner and outer group by operations for the SQL query including MDAs.

5. The method of claim 4, wherein the inner group by operation includes no aggregates.

6. The method of claim 4, wherein the outer group by operation includes a determination of aggregates for the SQL query including MDAs.

7. The method of claim 1, further comprising:
if the query type is a SQL query including the cube operation, generating $2^m$ groupings, where m is a number of grouping columns for the cube operation.

8. The method of claim 1, further comprising:
if the query type is a SQL query including the rollup operation, generating m+k+1 groupings, where m is a number of grouping columns and k is a number of aggregates for the rollup operation.

9. The method of claim 1, further comprising:
if the query type is a SQL query including the grouping sets operation, generating m+k+1 groupings, where m is a number of grouping columns and k is a number of aggregates for the grouping sets operation.

10. The method of claim 1, further comprising:
generating groupings to answer the query based on the query type.

11. A query processing apparatus comprising:
a memory storing a module comprising machine readable instructions to:
receive a query, the query comprising a structured query language (SQL) query;
determine a query type of the query based on whether the query comprises multiple distinct aggregates (MDAs), or cube, rollup or grouping sets operations;
based on the determined query type, process the query to generate an output comprising intermediate results;
process the intermediate results that are generated during the processing of the query, wherein the intermediate results are maintained in a single stream to prevent a distributed deadlock; and
perform a single or two successive group by operations on the output based on the query type to generate a response to the query; and
a processor to implement the module.

12. The apparatus of claim 11, further comprising machine readable instructions to:
perform the two successive group by operations if the query type is the SQL query including MDAs.

13. The apparatus of claim 11, further comprising machine readable instructions to:
generate inner and outer group by operations for a SQL query including MDAs.

14. The apparatus of claim 11, further comprising machine readable instructions to:
perform the single group by operation if the query type is the SQL query including cube, rollup or grouping sets operations.

15. A non-transitory computer readable medium having stored thereon machine readable instructions for query processing, the machine readable instructions when executed cause a computer system to:
receive a query;
determine a query type by determining if the query is a structured query language (SQL) query including multiple distinct aggregates (MDAs), or a SQL query including cube, rollup or grouping sets operations;
based on the determination, process the query to generate an output comprising intermediate results;
process the intermediate results that are generated during the processing of the query, wherein the intermediate results are maintained in a single stream to prevent a distributed deadlock; and
perform, by a processor, two successive group by operation on the output if the query type is the SQL query including MDAs, or one group by operation on the output if the query type is the SQL query including the cube, rollup or grouping sets operations to generate a response to the query.

* * * * *